US012097902B2

(12) United States Patent
Watanabe et al.

(10) Patent No.: US 12,097,902 B2
(45) Date of Patent: Sep. 24, 2024

(54) VEHICLE REAR PORTION STRUCTURE

(71) Applicant: HONDA MOTOR CO., LTD., Tokyo (JP)

(72) Inventors: Yasunori Watanabe, Wako (JP); Satoru Kawabe, Wako (JP); Masayasu Yoshida, Wako (JP); Atsushi Hasegawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 17/846,055

(22) Filed: Jun. 22, 2022

(65) Prior Publication Data

US 2023/0001988 A1 Jan. 5, 2023

(30) Foreign Application Priority Data

Jul. 1, 2021 (JP) ................. 2021-110277

(51) Int. Cl.
 B62D 21/15 (2006.01)
 B60R 19/24 (2006.01)
 B62D 27/02 (2006.01)

(52) U.S. Cl.
 CPC ............ *B62D 21/152* (2013.01); *B60R 19/24* (2013.01); *B62D 27/02* (2013.01)

(58) Field of Classification Search
 CPC ....... B60R 19/02; B60R 19/023; B60R 19/24; B62D 21/152; B62D 25/08; B62D 27/023; B62D 27/065
 USPC ............. 293/122; 296/186.3, 186.11, 193.08
 See application file for complete search history.

(56) References Cited

U.S. PATENT DOCUMENTS

| 6,729,682 B2* | 5/2004 | Delavalle ............... B62D 25/08 |
| | | 296/193.08 |
| 11,135,986 B2* | 10/2021 | Hasegawa ............... B60R 19/18 |
| 2014/0159428 A1 | 6/2014 | Katou et al. |
| 2017/0113734 A1* | 4/2017 | Kato ....................... B62D 25/08 |
| 2020/0172180 A1 | 6/2020 | Yamagishi |

FOREIGN PATENT DOCUMENTS

| JP | 64-044362 | 2/1989 |
| JP | 02-036768 | 10/1990 |
| JP | 03-042457 | 4/1991 |
| JP | 06-028363 | 8/1994 |
| JP | 11-059299 | 3/1999 |
| JP | 2002-264740 | 9/2002 |
| JP | 2008-265654 | 11/2008 |

(Continued)

OTHER PUBLICATIONS

Japanese Office Action for Japanese Patent Application No. 2021-170914 mailed Feb. 14, 2023.

*Primary Examiner* — Jason S Daniels
(74) *Attorney, Agent, or Firm* — Amin, Turocy & Watson, LLP (57) ABSTRACT

A vehicle rear portion structure includes: a rear side frame extending in a front-rear direction of a vehicle; a bumper beam disposed on a rear side of the rear side frame; and a rear panel provided between the rear side frame and the bumper beam. The rear panel includes a peripheral edge frame structure which is provided at an upper part of the bumper beam, and which has a closed cross-sectional structure. An upper projection of the bumper beam is in contact with a panel of the peripheral edge frame structure.

10 Claims, 5 Drawing Sheets

(56) References Cited

FOREIGN PATENT DOCUMENTS

| JP | 2020-199842 | 12/2020 |
| WO | 2013/018417 | 2/2013 |
| WO | 2014/112265 | 7/2014 |
| WO | 2019/003528 | 1/2019 |

* cited by examiner

VEHICLE REAR PORTION STRUCTURE

CROSS-REFERENCE TO RELATED APPLICATION

Priority is claimed on Japanese Patent Application No. 2021-110277, filed Jul. 1, 2021, the content of which is incorporated herein by reference.

BACKGROUND OF THE INVENTION

Field of the Invention

This invention relates to a vehicle rear portion structure.

Description of Related Art

As a vehicle rear portion structure of an automobile or the like, a technique is disclosed including a bumper beam extending in a vehicle width direction along a rear bumper and load absorbing portions respectively extending forward from both side portions of the bumper beam in the vehicle width direction (see, for example, Japanese Unexamined Patent Application, First Publication No. 2020-199842 A). Front end portions of the load absorbing portions are respectively joined to rear end portions of side frames that are provided on both side portions of a rear floor in the vehicle width direction and that are extending in a front-rear direction.

In such a constitution, when a load (rear collision load) is applied from behind the vehicle to the rear portion of the vehicle, the bumper beam is firstly bent and deformed to receive the rear collision load. After that, the rear collision load that cannot be completely received by the bumper beam is transmitted to the load absorbing portions, and the load absorbing portions receive the rear collision load.

SUMMARY OF THE INVENTION

In the above-described conventional technique, a transmission path of the rear collision load is limited to the vehicle width direction and the front-rear direction, and it is planar (two-dimensional). For this reason, it is difficult to efficiently absorb the rear collision load in the vehicle rear portion structure. Additionally, the rear collision load has to be absorbed at a planar position. Hence, there is a possibility that the weight of the vehicle rear portion structure increases in order to enhance the mechanical strength of the side frames and the like.

According to an aspect of the present invention, a vehicle rear portion structure, which is capable of efficiently absorbing the rear collision load, and the weight of which can be reduced, is provided.

(1) A vehicle rear portion structure (for example, a vehicle rear portion structure 1 in an embodiment) according to one aspect of the present invention includes: a frame (for example, a rear side frame 18 in an embodiment) extending in a front-rear direction of a vehicle (for example, a vehicle 100 in an embodiment); a bumper beam (for example, a bumper beam 6 or 206 in an embodiment) disposed on a rear side of the frame; and a rear panel (for example, a rear panel 5 in an embodiment) provided between the frame and the bumper beam, in which the rear panel includes an upper structure (for example, a peripheral edge frame structure 15 in an embodiment) which is provided at an upper part of the bumper beam and which has a closed cross-sectional structure, and an upper portion (for example, an upper projection 26 or 226 in an embodiment) of the bumper beam is in contact with a lower surface (for example, a panel 16 in an embodiment) of the upper structure.

With the constitution as the above aspect (1), the rear collision load applied to the bumper beam is transmitted not only to the frame (in a planar manner) but also to the upper structure located above the bumper beam. That is, the load transmission path of the rear collision load becomes three-dimensional, and the rear collision load can be efficiently absorbed by the vehicle rear portion structure. The mechanical strength of the frame can be relaxed, because the rear collision load is not received only in a planar manner, and the weight of the vehicle rear portion structure can be reduced accordingly.

The upper portion of the bumper beam is in contact with the lower surface of the upper structure, and thus the generation of a moment in the bumper beam can be prevented, when the rear collision load is applied to the bumper beam. Therefore, the mechanical strength of the parts to which the rear collision load is applied through the bumper beam can be relaxed, and furthermore, the weight of the vehicle rear portion structure can be reduced.

In addition, the rear collision load is received by the bumper beam without the generation of a moment, and the rear collision load is received by the upper structure with which the bumper beam is brought into contact. Therefore, the mechanical strength of the vehicle rear portion structure against the rear collision load can be sufficiently ensured.

(2) In the constitution in the above aspect (1), the bumper beam may be fastened and fixed with a bolt (for example, a bolt 30 in an embodiment) to be screwed into the rear panel from an inside of the bumper beam via the bumper beam.

With the constitution as the above aspect (2), the bumper beam can be fastened and fixed to the rear panel without the provision, at the bumper beam, of a flange or the like for fixing the bumper beam to the rear panel. Accordingly, it is possible to prevent the bumper beam from being insufficiently brought into contact with the rear panel due to the flange or the like that becomes a hindrance. Therefore, the rear collision load applied to the bumper beam can be efficiently transmitted to the rear panel.

(3) In the constitution in the above aspect (1), the bumper beam may be fastened and fixed with a bolt (for example, a bolt 30 in an embodiment) to be screwed into the upper structure from an inside of the bumper beam through the bumper beam.

With the constitution as the above aspect (3), the bumper beam can be fastened and fixed to the upper structure without the provision, at the bumper beam, of a flange or the like for fixing the bumper beam to the upper structure. Accordingly, it is possible to prevent the bumper beam from being insufficiently brought into contact with the rear panel due to the flange or the like that becomes a hindrance. Therefore, the rear collision load applied to the bumper beam can be efficiently transmitted to the rear panel.

(4) In the constitution in the above aspect (2) or (3), a hole (for example, a through hole 31 in an embodiment) may be defined in the bumper beam, and the bolt and a tool for fastening the bolt are insertable into the hole in a front-rear direction of the vehicle.

With the constitution as the above aspect (4), without the provision, at the bumper beam, of a flange or the like, the bumper beam can be fastened and fixed to the frame and the upper structure with the bolt with certainty.

(5) In the constitution in the above aspect (1), a position of a rear end (for example, a rear vertical wall 25b or 224b in an embodiment) and a lower end (for example, a lower end portion 224e in an embodiment) of the bumper beam may be located lower than a position of a front end (for example, a front vertical wall 24a or 224a in an embodiment) and a lower end (for example, a lower end portion 224d in an embodiment) of the bumper beam.

With the constitution as the above aspect (5), for example, even in a case where the height of the vehicle or the height of the floor panel provided on a front side of the bumper beam varies depending on the vehicle type, it becomes possible to receive the rear collision load with the bumper beam with certainty.

(6) In the constitution in the above aspect (1), a position of a front end (for example, a front vertical wall 24a or 224a in an embodiment) and a lower end (for example, a lower end portion 24d or 224d in an embodiment) of the bumper beam may be located upper than a position of a spare tire (for example, a spare tire 101 in an embodiment) disposed on a front side of the bumper beam.

With the constitution as the above aspect (6), when the spare tire is assembled into the vehicle, it is possible to prevent degradation in the assembling workability of the spare tire due to the bumper beam that becomes a hindrance.

(7) The constitution in the above aspect (1) may further include a peripheral edge frame (for example, an upper peripheral edge frame 8, a lower peripheral edge frame 9, or a side peripheral edge frame 10 in an embodiment) that forms a rear opening (for example, a rear opening 4 in an embodiment) communicating a baggage compartment (for example, a trunk room 3 in an embodiment) provided at a rear portion of the vehicle and an outside of the vehicle, in which an upper portion of the rear panel may be coupled with the peripheral edge frame.

With the constitution as the above aspect (7), the load applied to the bumper beam can be transmitted to the peripheral edge frame that forms the rear opening through the rear panel. Accordingly, the load transmission path of the rear collision load becomes further three-dimensional, and the rear collision load can be efficiently absorbed by the vehicle rear portion structure.

(8) In the constitution in the above aspect (1), the bumper beam may include at least one closed cross-sectional structure (for example, a first closed cross-sectional structure 24, a second closed cross-sectional structure 25, or a closed cross-sectional structure 224 in an embodiment) including projections (for example, an upper projection 26 or 226 and a lower projection 27 in an embodiment) on up and down sides when viewed from a vehicle width direction of the vehicle.

With the constitution as the above aspect (8), the bumper beam can be easily bent and deformed while having the projections as starting points for crush. The projections are disposed on up and down sides, so that the bumper beam can be easily crushed by the rear collision load applied from the horizontal direction.

(9) In the constitution in the above aspect (8), the bumper beam may include a plurality of the closed cross-sectional structures, and the plurality of the closed cross-sectional structures are disposed to be aligned in a front-rear direction of the vehicle.

Here, for example, in a case where the bumper beam is constituted by one closed cross-sectional structure, the width of the closed cross-sectional structure in the front-rear direction increases, accordingly. Therefore, when the rear collision load is applied and the bumper beam is crushed, a deformed amount of the bumper beam in the front-rear direction also increases. Furthermore, in order to absorb such a deformed amount, a deformed amount in the up-down direction of the projection also increases. In such a case, there is a high possibility that the deformed bumper beam comes into contact with members near the bumper beam and those nearby members are also damaged.

On the other hand, as the above aspect (9), by constituting the bumper beam with a plurality of closed cross-sectional structures aligned in the front-rear direction, the deformed amount in the up-down direction when the bumper beam is crushed can be made as small as possible. Therefore, even when the bumper beam is crushed, damage to the members near the bumper beam can be suppressed.

(10) The constitution in the above aspect (8) or (9) may further include a reinforcement plate (for example, a first reinforcement plate 28 or a second reinforcement plate 29 in an embodiment) provided inside the closed cross-sectional structure and extending in a direction intersecting a front-rear direction and an up-down direction, when viewed from the vehicle width direction of the vehicle.

With the constitution as the above aspect (10), the mechanical strength of the bumper beam can be increased. Therefore, characteristics of absorbing the rear collision load by the bumper beam can be improved.

According to an aspect of the present invention, the rear collision load can be efficiently absorbed by the vehicle rear portion structure. As a result, the weight of the vehicle rear portion structure can be reduced.

DETAILED DESCRIPTION OF THE INVENTION

Hereinafter, embodiments of the present invention will be described, based on the drawings. In the following description, a front side in a traveling direction of a vehicle 100 is simply referred to as a front side, a rear side of the vehicle 100 is simply referred to as a rear side, vertical up-down directions are referred to as an upper side and a lower side, and a vehicle width direction of the vehicle 100 is referred to as a vehicle width direction or a left-right direction. An arrow FR pointing to the front side of the vehicle 100, an arrow UP pointing to the upper side of the vehicle 100, and an arrow LH pointing to a left lateral side of the vehicle are given at appropriate positions in each of the drawings to be described below. In addition, in the following description, join means joining by welding such as spot welding.

First Embodiment

Figure 1:
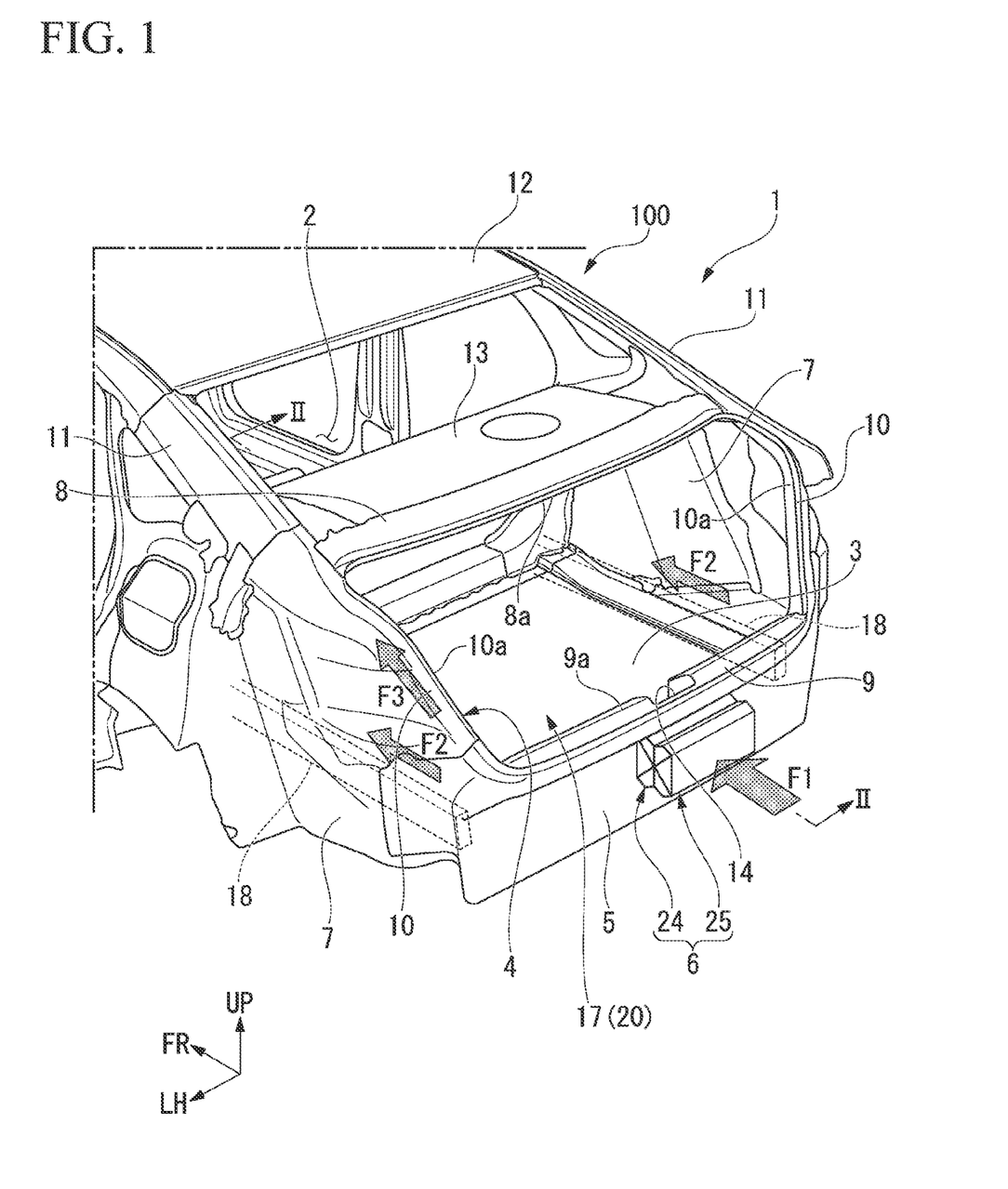
FIG. 1 is a perspective view of an upper side of a vehicle rear portion structure in a first embodiment of the present invention, when viewed obliquely from a rear left side.
Figure 2:
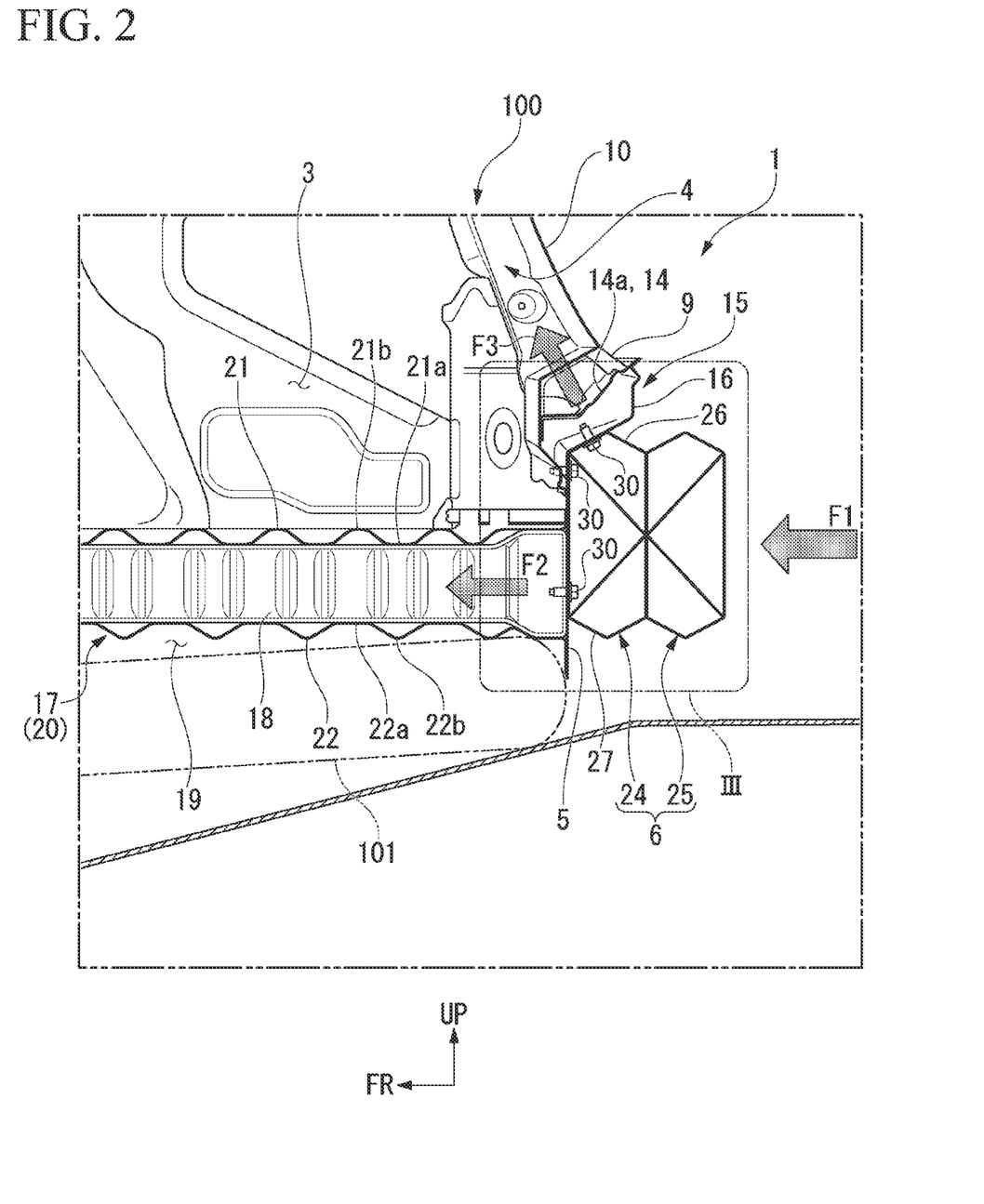
FIG. 2 is a cross-sectional view taken along line II-II of FIG. 1.

FIG. 1 is a perspective view of an upper side of a rear portion structure 1 of a vehicle 100 (hereinafter, referred to as a vehicle rear portion structure 1), when viewed obliquely from a rear left side. In FIG. 1, illustrations of some component parts are omitted so as to make the description easy to understand. FIG. 2 is a cross-sectional view taken along line II-II of FIG. 1.

As illustrated in FIGS. 1 and 2, the vehicle rear portion structure 1 is mainly constituted by a trunk room (baggage compartment) 3 provided on a rear side of a cabin (passenger cabin) 2, a rear opening 4 that communicates the trunk room 3 with the outside of the vehicle 100, a rear panel 5 provided in a rear lower portion of the rear opening 4, a bumper beam 6 fixed to the rear opening 4 through the rear panel 5, and outer panels 7 provided on both left and right sides of the rear opening 4.

The rear opening 4 can be opened and closed by a trunk lid, not illustrated. The rear opening 4 includes an upper peripheral edge frame 8 forming an upper edge portion of the rear opening 4, a lower peripheral edge frame 9 forming a lower edge portion of the rear opening 4, and two side peripheral edge frames 10 forming left and right edge portions of the rear opening 4.

The upper peripheral edge frame 8 and the lower peripheral edge frame 9 extend along the vehicle width direction. The side peripheral edge frames 10 extend so as to connect both ends of the upper peripheral edge frame 8 in the vehicle width direction and both ends of the lower peripheral edge frame 9 in the vehicle width direction. The side peripheral edge frames 10 extend, obliquely downward from a rear side of the upper peripheral edge frame 8, and are then bent to extend downward to reach the lower peripheral edge frame 9.

Further, the peripheral edge frames 8 to 10 are each formed to extend rearward, and are then folded back toward the front side. An opening edge of the rear opening 4 is formed with each of bending portions 8a, 9a, and 10a formed by folding back. In addition to this, although an illustration is omitted, a weather strip is attached to each of the peripheral edge frames 8 to 10 over the entire circumference. When a trunk lid, not illustrated, is closed, the weather strip seals between the rear opening 4 and the trunk lid (the inside and the outside of the vehicle interior) in a watertight manner. A seal flange for attaching the weather strip is provided on each of the peripheral edge frames 8 to 10 over the entire circumference.

In addition, the upper peripheral edge frame 8 and the side peripheral edge frames 10 are each provided with a drip portion, not illustrated. The drip portion is located on an outer peripheral side (the outer side of the vehicle) of the rear opening 4 with respect to the seal flange and the weather strip. The drip portion guides rainwater or the like that has entered the inside of the vehicle from the outer panel through a gap on the outer periphery of the trunk lid (not illustrated, either) to a predetermined drain passage.

In addition to that, an upper end of the side peripheral edge frame 10 is joined to a rear pillar 11. The rear pillar 11 extends forward from the upper end of the side peripheral edge frame 10, also extends obliquely upward, and is joined to a roof panel 12. A rear end of a rear parcel shelf 13 is joined to the upper peripheral edge frame 8. The rear parcel shelf 13 horizontally extends to forward from an entire front edge of the upper peripheral edge frame 8. The rear parcel shelf 13 defines an upper height of a front portion of the trunk room 3. From a front edge portion of the rear parcel shelf 13, a trunk room front panel (not illustrated) extends downward to define a front end position (depth) of the trunk room 3. A bottom portion of the trunk room 3 is formed of a rear floor panel 17 to be described later.

A striker attachment portion 14 is formed at the center of the lower peripheral edge frame 9 in the vehicle width direction. The striker attachment portion 14 is formed by making a recess in an upper portion of the lower peripheral edge frame 9. A letter U-shaped striker, not illustrated, is provided on a bottom portion 14a of the striker attachment portion 14. The striker is engaged with a latch of a trunk lid, not illustrated, to hold the trunk lid in a closed state.

At the bottom portion 14a of the striker attachment portion 14, a peripheral edge frame structure 15 having a closed cross-sectional structure is formed by the bottom portion 14a and a panel 16 provided on a lower side of the bottom portion 14a. An upper portion of the rear panel 5 is joined to lower portions of the lower peripheral edge frame 9 and the peripheral edge frame structure 15 (the panel 16). The rear panel 5 is a metal panel extending downward from the lower peripheral edge frame 9, and also extending along the left-right direction. The upper portion of the rear panel 5 is integrally molded with the panel 16 of the peripheral edge frame structure 15. That is, it can be said that the rear panel 5 includes the peripheral edge frame structure 15 provided as an upper part.

On the front surface of the rear panel 5, a pair of rear side frames 18 are disposed on both left and right sides. The pair of rear side frames 18 extend along the front-rear direction. Rear ends of the pair of rear side frames 18 are joined to the front surface of the rear panel 5. A rear end of a reinforcement, not illustrated, is joined to front ends of the pair of rear side frames 18.

In addition, the rear floor panel 17 is joined to the front surface of the rear panel 5. The rear floor panel 17 is constituted by a double panel structure 20 including an upper panel 21 and a lower panel 22 disposed to face each other in the up-down direction.

The upper panel 21 and the lower panel 22 are each made up of, for example, a plate made of aluminum or the like. The upper panel 21 and the lower panel 22 extend in the horizontal direction across the pair of rear side frames 18.

The upper panel 21 and the lower panel 22 are constituted to have identical shapes, and for example, are partially inverted from each other in the up-down direction. A plurality of upper projecting strip portions 21b are formed on an upper surface 21a of the upper panel 21. The plurality of upper projecting strip portions 21b extend in the vehicle width direction, and are disposed to be aligned in the front-rear direction. The upper projecting strip portions 21b are each formed to be recessed on the lower surface side.

A plurality of lower projecting strip portions 22b are formed on a lower surface 22a of the lower panel 22. The plurality of lower projecting strip portions 22b extend in the vehicle width direction, and are disposed to be aligned in the front-rear direction. The plurality of lower projecting strip portions 22b are formed to be recessed on the upper surface side.

The pair of rear side frames 18 are disposed between the upper panel 21 and the lower panel 22, which have been formed in this manner. The rear side frames 18 are also joined to the upper panel 21 and the lower panel 22.

A space formed below the lower panel 22 is constituted as a tire storage section 19. A spare tire 101 is accommodated in the tire storage section 19.

Figure 3:
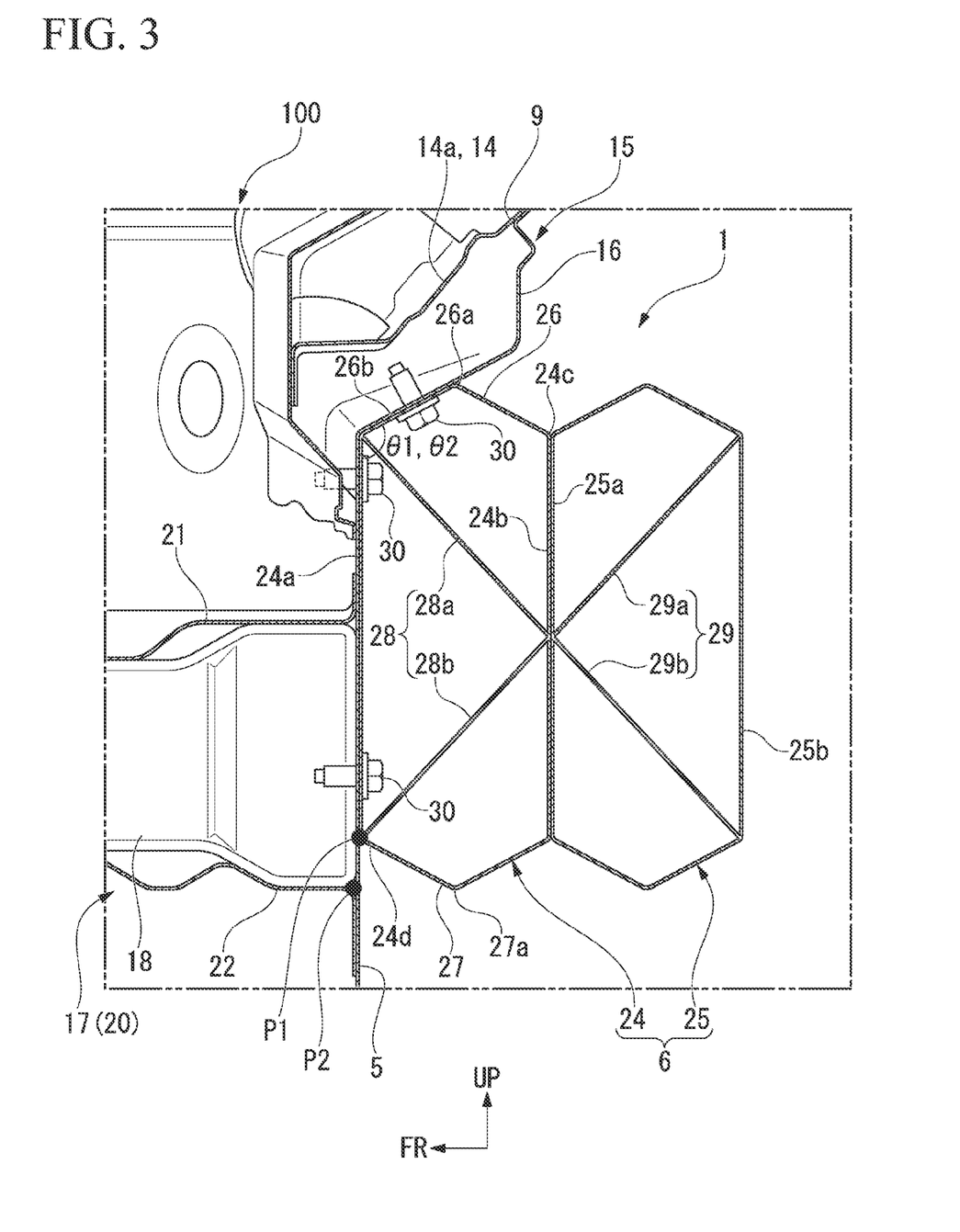
FIG. 3 is an enlarged view of a III portion of FIG. 2.
Figure 4:
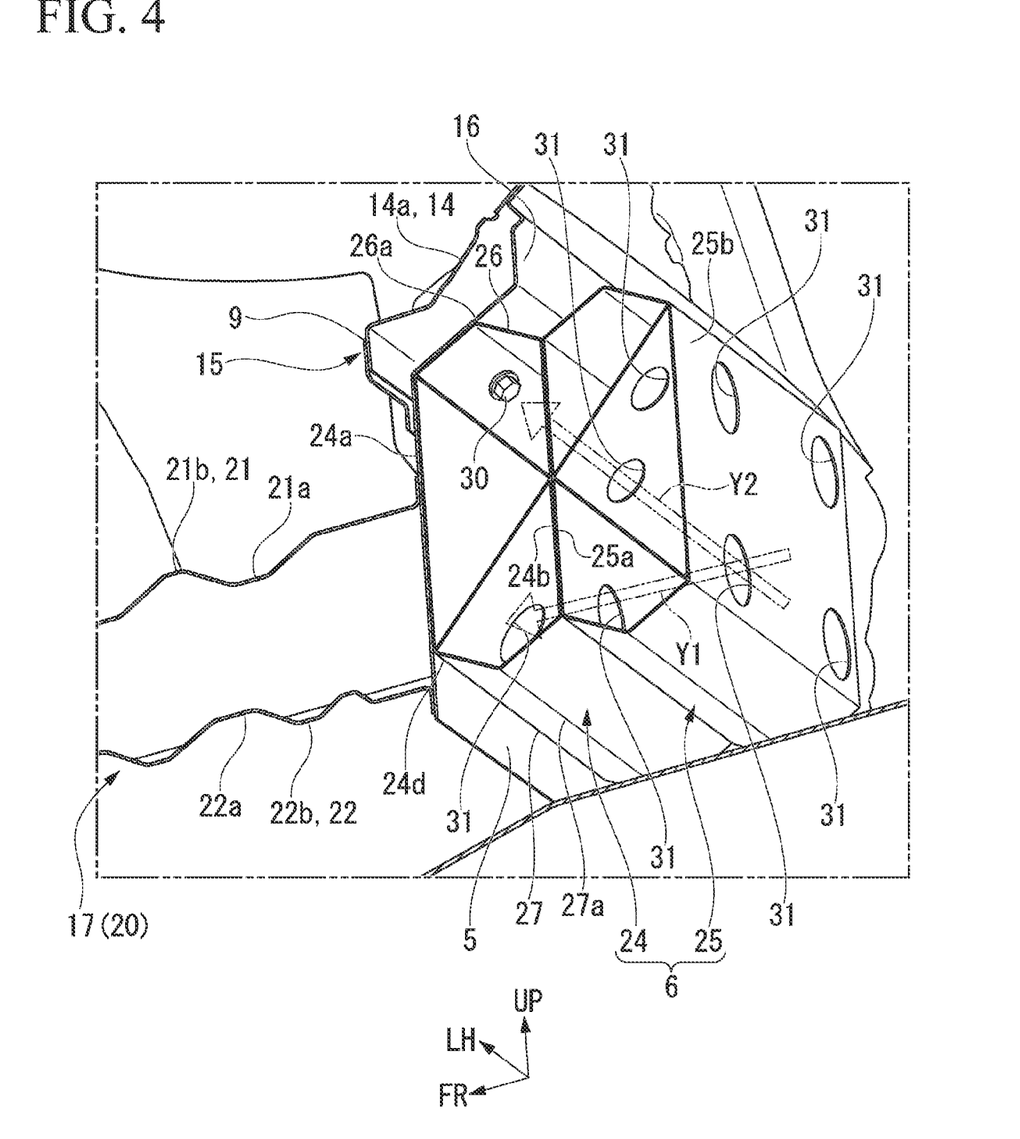
FIG. 4 is a perspective view of a bumper beam in the first embodiment of the present invention, when viewed obliquely from a lower left side.

FIG. 3 is an enlarged view of an III portion of FIG. 2. FIG. 4 is a perspective view of the bumper beam 6, when viewed obliquely from a lower left side.

As illustrated in FIGS. 1, 3, and 4, the bumper beam 6 fixed to the rear opening 4 through the rear panel 5 is disposed on the rear surface of the rear panel 5 and at the center in the vehicle width direction. The bumper beam 6 can be formed by, for example, pressing a metal plate.

However, without being limited to this, the bumper beam 6 may be formed by aluminum molding or the like. The bumper beam 6 is constituted to be crushable by a load (hereinafter, referred to as a rear collision load) applied from behind. Hereinafter, the constitution of the bumper beam 6 will be described in detail.

The bumper beam 6 includes two closed cross-sectional structures 24 and 25 (a first closed cross-sectional structure 24 and a second closed cross-sectional structure 25) aligned in the front-rear direction. The two closed cross-sectional structures 24 and 25 have identical constitutions. Therefore, in the following description, only the first closed cross-sectional structure 24 of the two closed cross-sectional structures 24 and 25 will be described. Regarding the second closed cross-sectional structure 25, its description will be omitted by use of the same name with the first closed cross-sectional structure 24, and a description will be given as necessary.

The first closed cross-sectional structure 24 is formed to extend in the vehicle width direction along the rear panel 5. The length of the first closed cross-sectional structure 24 in the vehicle width direction is, for example, approximately three times the width of the striker attachment portion 14 in the vehicle width direction. However, without being limited to this, the length of the first closed cross-sectional structure 24 in the vehicle width direction can be optionally set.

The first closed cross-sectional structure 24 has a tubular shape elongated in the vehicle width direction. In addition, the first closed cross-sectional structure 24 is formed in a rectangular tubular shape that is long in the up-down direction, when viewed from the vehicle width direction. The first closed cross-sectional structure 24 includes a front vertical wall 24a and a rear vertical wall 24b, which are disposed to face each other in the front-rear direction, and which extend along the left-right direction and the up-down direction.

An upper projection 26 is formed at an upper end portion 24c of the first closed cross-sectional structure 24. The upper projection 26 tapers upward, when viewed from the vehicle width direction. A lower projection 27 is formed at a lower end portion 24d of the first closed cross-sectional structure 24. The lower projection 27 tapers downward, when viewed from the vehicle width direction. A ridge portion 26a of the upper projection 26 and a ridge portion 27a of the lower projection 27 are located at the center in the front-rear direction of the first closed cross-sectional structure 24.

An angle θ1 between the front vertical wall 24a and one wall 26b of the upper projection 26, which is continuous with the front vertical wall 24a, is identical to an angle θ2 between the rear panel 5 and the panel 16. In such a constitution, the first closed cross-sectional structure 24 is disposed such that the front vertical wall 24a overlaps (is in contact with) the rear panel 5, and in addition, such one wall 26b of the upper projection 26 overlaps (is in contact with) the panel 16 (the peripheral edge frame structure 15).

In such an arranged state, the position of a joint portion P1 between the front vertical wall 24a and the lower projection 27 is located above the position of an intersection point P2 between the plane direction of the lower panel 22 and the rear panel 5. Furthermore, the ridge portion 27a of the lower projection 27 is located on an upper side than the intersection point P2. The space formed below the lower panel 22 is constituted as the tire storage section 19. Therefore, the joint portion P1 between the front vertical wall 24a and the lower projection 27 and the ridge portion 27a of the lower projection 27 are located on an upper side than the tire storage section 19 (the spare tire 101).

The first closed cross-sectional structure 24 is fastened and fixed to the rear panel 5 and the peripheral edge frame structure 15 with a plurality of bolts 30. More specifically, the bolts 30 are inserted into four corners of the front vertical wall 24a from the rear side. These bolts 30 are screwed into the rear panel 5. In addition, the bolts 30 are each inserted from the rear side into such one wall 26b of the upper projection 26 on both sides in the vehicle width direction. These bolts 30 are fastened and fixed to the panel 16 of the peripheral edge frame structure 15.

The second closed cross-sectional structure 25 is disposed next to the first closed cross-sectional structure 24 constituted as described above so that a front vertical wall 25a of the second closed cross-sectional structure 25 overlaps with the rear vertical wall 24b of the first closed cross-sectional structure 24. The rear vertical wall 24b of the first closed cross-sectional structure 24 and the front vertical wall 25a of the second closed cross-sectional structure 25 are joined to each other.

A first reinforcement plate 28 is formed inside the first closed cross-sectional structure 24. The first reinforcement plate 28 is formed in a letter L shape projecting rearward, when viewed from the vehicle width direction. That is, the first reinforcement plate 28 includes an upper inclined plate 28a extending diagonally from an upper end of the front vertical wall 24a to the center of the rear vertical wall 24b in the up-down direction, when viewed from the vehicle width direction, and a lower inclined plate 28b extending diagonally from the center in the up-down direction of the rear vertical wall 24b to a lower end of the front the front vertical wall 24a.

A second reinforcement plate 29 is formed inside the second closed cross-sectional structure 25. The second reinforcement plate 29 is formed in a letter L shape projecting forward, when viewed from the vehicle width direction. That is, the second reinforcement plate 29 includes an upper inclined plate 29a extending diagonally from an upper end of the rear vertical wall 25b to the center of the front vertical wall 25a in the up-down direction, when viewed from the vehicle width direction, and a lower inclined plate 29b extending diagonally from the center of the front vertical wall 24a in the up-down direction to a lower end of the rear vertical wall 25b.

In a state in which the first closed cross-sectional structure 24 and the second closed cross-sectional structure 25 are aligned in the front-rear direction, the upper inclined plate 28a of the first reinforcement plate 28 and the lower inclined plate 29b of the second reinforcement plate 29 are located on an identical plane. In addition, the lower inclined plate 28b of the first reinforcement plate 28 and the upper inclined plate 29a of the second reinforcement plate 29 are located on an identical plane. Therefore, the bumper beam 6 as a whole has a shape in which four corners of the bumper beam 6 are reinforced by the reinforcement plates 28 and 29 in a diagonal brace structure.

In addition, regarding the first closed cross-sectional structure 24 and the second closed cross-sectional structure 25, a plurality of through holes 31 are formed for enabling insertion of the bolts 30 from the rear side of the second closed cross-sectional structure 25 and enabling fastening of the bolts 30 to the rear panel 5 and the peripheral edge frame structure 15. Not only the bolt 30 but also a tool, not illustrated, for fastening the bolt 30 are insertable into the through hole 31.

More specifically, in a case where the bolt 30 is screwed into the rear panel 5 through the front vertical wall 24a of the first closed cross-sectional structure 24, the plurality of through holes 31 are formed as follows. That is, the plurality of through holes 31 are formed to be insertable the bolt 30 and a tool, not illustrated, horizontally toward the front side from the rear side of the second closed cross-sectional structure 25 (see an arrow Y1 in FIG. 4).

Further, in a case where the bolt 30 is screwed into the panel 16 of the peripheral edge frame structure 15 through the upper projection 26 of the first closed cross-sectional structure 24, the plurality of through holes 31 are formed as follows. That is, the plurality of through holes 31 are formed to be insertable the bolt 30 and a tool, not illustrated, toward an obliquely upper side from the rear side of the second closed cross-sectional structure 25 (see an arrow Y2 in FIG. 4).

Note that although an illustration is omitted, a rear bumper that serve as an exterior extends over the entire vehicle width direction on a rear side of the bumper beam 6. The locations near both sides of the rear bumper in the vehicle width direction are located at the rear side of the rear side frames 18.

<Operations of Vehicle Rear Portion Structure>

Next, operations of the vehicle rear portion structure 1 will be described, based on FIGS. 1 and 2.

When a rear collision load F1 is applied to the vehicle rear portion structure 1, the rear collision load F1 is firstly applied to the bumper beam 6 through the rear bumper, not illustrated. The rear collision load F1 is also applied to the rear side frames 18 through the rear bumper, not illustrated. The rear bumper is long in the vehicle width direction. Hence, the rear collision load F1 applied to the rear bumper is preferentially applied to the bumper beam 6 while being applied to the rear side frames 18.

The bumper beam 6 is constituted to be crushable by the rear collision load F1. Therefore, firstly, the bumper beam 6 receives the rear collision load F1, while the bumper beam 6 is being crushed. In other words, while the bumper beam 6 is being crushed, the rear collision load F1 is absorbed by the bumper beam 6.

Here, the bumper beam 6 includes two closed cross-sectional structures 24 and 25 aligned in the front-rear direction. The projections 26 and 27 are formed at both end portions in the up-down direction of each of the closed cross-sectional structures 24 and 25. The upper projection 26 tapers upward, when viewed from the vehicle width direction. The lower projection 27 tapers downward, when viewed from the vehicle width direction. Therefore, when a load in the front-rear direction (the rear collision load F1) is applied to each of the closed cross-sectional structures 24 and 25, each of the projections 26 and 27 is easily bent while having the ridge portions 26a and 27a as starting points. More specifically, when the rear collision load F1 is applied to each of the projections 26 and 27, crushing of the bumper beam 6 is developed, while each of the ridge portions 26a and 27a is being displaced to escape outward in the up-down direction.

On the other hand, the reinforcement plates 28 and 29 are formed inside the bumper beam 6. The mechanical strength of the bumper beam 6 is also ensured to some extent. Therefore, the bumper beam 6 is not easily crushed by a light load. The bumper beam 6 is crushed, when the rear collision load F1 somewhat larger than the light load is applied. Accordingly, the load absorbed by the bumper beam 6 is not limited to a light load, and a load somewhat larger than the light load is also easily absorbed.

In addition, the rear panel 5 is provided between the bumper beam 6 and the rear side frames 18. The rear panel 5 includes the peripheral edge frame structure 15 provided as an upper part and having a closed cross-sectional structure. The upper projection 26 of the bumper beam 6 overlaps (is in contact with) the panel 16 (the lower surface) of the peripheral edge frame structure 15. Therefore, while the bumper beam 6 is receiving the rear collision load F1, the rear collision load F1 is transmitted to the pair of rear side frames 18 through the rear panel 5 (see a load F2 in FIGS. 1 and 2). Accordingly, the rear collision load F1 applied to the bumper beam 6 is transmitted to the pair of rear side frames 18 similarly to the rear collision load F1 applied to the rear bumper. Then, these rear side frames 18 also receive the rear collision load F1.

Furthermore, while the bumper beam 6 is receiving the rear collision load F1, the rear collision load F1 is transmitted to the peripheral edge frame structure 15. The peripheral edge frame structure 15 is a part (the lower peripheral edge frame 9) of the peripheral edge frames 8 to 10 constituting the rear opening 4. Then, an upper portion of the rear panel 5 is integrally molded with the panel 16 of the peripheral edge frame structure 15. Therefore, the rear collision load F1 that has been transmitted to the peripheral edge frame structure 15 is transmitted to the peripheral edge frames 8 to 10. Furthermore, the rear collision load F1 is transmitted to the rear pillar 11 through the side peripheral edge frame 10 among the peripheral edge frames 8 to 10 (see a load F3 in FIGS. 1 and 2).

Here, the peripheral edge frame structure 15 has a closed cross-sectional structure, and thus, the mechanical strength can be increased, as compared with the bumper beam 6. As a result, when the rear collision load F1 is applied to the bumper beam 6, the forward displacement of the bumper beam 6 is restricted by the peripheral edge frame structure 15. Therefore, when the rear collision load F1 is applied to the bumper beam 6, the bumper beam 6 is actively crushed at first to absorb the rear collision load F1. After that, the rear collision load F1 is transmitted to the rear side frames 18 and the peripheral edge frames 8 to 10.

In addition, the rear collision load F1 transmitted to the rear panel 5 through the bumper beam 6 is also transmitted to the rear floor panel 17 disposed on a front side of the rear panel 5. The rear floor panel 17 is constituted by a double panel structure 20 including the upper panel 21 and the lower panel 22 disposed to face each other in the up-down direction. Therefore, the rear collision load F1 applied to the rear floor panel 17 is dispersed to the upper panel 21 and the lower panel 22.

A plurality of projecting strip portions 21b and 22b extending in the vehicle width direction are provided on the respective panels 21 and 22. These projecting strip portions 21b and 22b extend in the vehicle width direction. Accordingly, the mechanical strength against the load applied from the front-rear direction is weaker than the mechanical strength against the load applied from the vehicle width direction. Therefore, when the rear collision load F1 is applied to each of the panels 21 and 22, each of the panels 21 and 22 is crushed to absorb the rear collision load F1. Then, transmission of the rear collision load F1 to the front side of each of the panels 21 and 22 is prevented as much as possible.

In this manner, the above-described vehicle rear portion structure 1 includes the pair of rear side frames 18, the bumper beam 6 disposed on the rear side of the rear side frames 18, and the rear panel 5 provided between the rear side frames 18 and the bumper beam 6. The rear panel 5 includes the peripheral edge frame structure 15 provided above the bumper beam 6. The upper portion (the upper projection 26) of the bumper beam 6 is in contact with the lower surface (the panel 16) of the peripheral edge frame structure 15. Therefore, the rear collision load F1 that has been applied to the bumper beam 6 is transmitted to the rear side frames 18 (in a planar manner), and is also transmitted to the peripheral edge frame structure 15 located above the bumper beam 6. That is, the load transmission path of the rear collision load F1 becomes three-dimensional, and the rear collision load F1 can be efficiently absorbed by the vehicle rear portion structure 1. The mechanical strength of the rear side frames 18 can also be reduced, because the rear collision load F1 is not received only in a planar manner, and the weight of the vehicle rear portion structure 1 can be reduced accordingly.

The upper portion of the bumper beam 6 is in direct contact with the peripheral edge frame structure 15. Thus, it is possible to prevent the generation of a moment from in the bumper beam 6, when the rear collision load F1 is applied to the bumper beam 6. Therefore, the mechanical strength of the parts to which the rear collision load F1 is applied through the bumper beam 6 can be relaxed, and furthermore, the weight of the vehicle rear portion structure 1 can be reduced.

In addition, the rear collision load F1 is received by the bumper beam 6 without the generation of a moment, and the rear collision load F1 is received by the peripheral edge frame structure 15 with which the bumper beam 6 is brought into contact. Therefore, the mechanical strength of the vehicle rear portion structure 1 against the rear collision load F1 can be sufficiently ensured. The peripheral edge frame structure 15 also receives the rear collision load F1, and thus the mechanical strength of the bumper beam 6 itself can also be easily ensured.

In the first closed cross-sectional structure 24 and the second closed cross-sectional structure 25 constituting the bumper beam 6, a plurality of through holes 31 are formed for enabling insertion of the bolts 30 from the rear side of the second closed cross-sectional structure 25 and enabling fastening of the bolts 30 to the rear panel 5 and the peripheral edge frame structure 15. Not only the bolt 30 but also a tool, not illustrated, for fastening the bolt 30 are insertable into the through hole 31. Therefore, the bumper beam 6 does not have to be provided with a flange or the like for fastening and fixing the bumper beam 6 to the rear panel 5 and the peripheral edge frame structure 15. Then, the bumper beam 6 can be fastened and fixed to the rear panel 5 and the peripheral edge frame structure 15 with the bolts 30. Accordingly, it is possible to prevent the bumper beam 6 from being insufficiently brought into contact with the rear panel 5 and the peripheral edge frame structure 15 due to the flange or the like that becomes a hindrance. Therefore, the rear collision load F1 applied to the bumper beam 6 can be efficiently transmitted to the rear panel 5 and the peripheral edge frame structure 15.

The position of the joint portion P1 between the front vertical wall 24a and the lower projection 27 in the bumper beam 6 is located above the position of the intersection point P2 between the plane direction of the lower panel 22 and the rear panel 5 in the rear floor panel 17. Furthermore, the ridge portion 27a of the lower projection 27 is located on an upper side than the intersection point P2. That is, the joint portion P1 between the front vertical wall 24a and the lower projection 27, and the ridge portion 27a of the lower projection 27 are located on an upper side than the tire storage section 19 (the spare tire 101). Therefore, when the spare tire 101 is assembled into the vehicle 100, it is possible to prevent degradation in the assembling workability of the spare tire 101 due to the bumper beam 6 that becomes a hindrance.

The upper portion of the rear panel 5 is integrally molded with the panel 16 of the peripheral edge frame structure 15. The peripheral edge frame structure 15 is a part of the lower peripheral edge frame 9 of the peripheral edge frames 8 to 10, which form the rear opening 4 of the vehicle 100. That is, the upper portion of the rear panel 5 is connected with the lower peripheral edge frame 9. Therefore, the rear collision load F1 applied to the bumper beam 6 can be transmitted to the peripheral edge frames 8 to 10 through the rear panel 5. Accordingly, the load transmission path of the rear collision load F1 becomes further three-dimensional, and the rear collision load F1 can be efficiently absorbed by the vehicle rear portion structure 1.

The bumper beam 6 includes two closed cross-sectional structures 24 and 25 (a first closed cross-sectional structure 24 and a second closed cross-sectional structure 25) aligned in the front-rear direction. Each of the closed cross-sectional structures 24 and 25 includes the upper projection 26 formed at the upper end portion 24c and the lower projection 27 formed at the lower end portion 24d. Therefore, when the rear collision load F1 is applied to the bumper beam 6, the bumper beam 6 can be easily crushed while having the ridge portion 26a of the upper projection 26 and the ridge portion 27a of the lower projection 27 as starting points of the crush.

Moreover, the bumper beam 6 is formed of the two closed cross-sectional structures 24 and 25, so that the deformed amount in the up-down direction when the bumper beam 6 is crushed can be made as small as possible. That is, for example, in a case where the bumper beam 6 is constituted by one closed cross-sectional structure, the width of the closed cross-sectional structure in the front-rear direction increases accordingly. Therefore, when the rear collision load is applied and the bumper beam 6 is crushed, the deformed amount of the bumper beam 6 in the front-rear direction also increases. Furthermore, in order to absorb such a deformed amount, the deformed amount in the up-down direction of each of the projections 26 and 27 also increases. In such a case, there is a high possibility that the deformed bumper beam 6 comes into contact with members near the bumper beam 6 and the peripheral member is also damaged.

On the other hand, the bumper beam 6 is formed of the two closed cross-sectional structures 24 and 25, so that the deformed amount of deformation in the up-down direction when the bumper beam 6 is crushed can be made as small as possible.

Therefore, even when the bumper beam 6 is crushed, damage to the members near the bumper beam 6 can be suppressed.

The reinforcement plates 28 and 29 extending in a direction intersecting the front-rear direction and the up-down direction, when viewed from the vehicle width direction, are respectively provided inside the closed cross-sectional structures 24 and 25. Therefore, the mechanical strength of the bumper beam 6 can be increased. Accordingly, the bumper beam 6 is not easily crushed by a light load. The bumper beam 6 is made to crush, when the rear collision load F1 somewhat larger than the light load is applied. Therefore, the absorption characteristics of the rear collision load F1 by the bumper beam 6 can be improved.

Note that in the above-described first embodiment, the description has been given for the case where the bumper beam 6 includes the two closed cross-sectional structures 24 and 25 aligned in the front-rear direction. However, without being limited to this, it is sufficient if the bumper beam 6 is constituted by at least one closed cross-sectional structure. The bumper beam 6 may be constituted by three or more closed cross-sectional structures.

In the above-described first embodiment, the description has been given for the case where mating surfaces of the two closed cross-sectional structures 24 and 25 are constituted by the two vertical walls 24b and 25a, which are the rear vertical wall 24b of the first closed cross-sectional structure 24 and the front vertical wall 25a of the second closed cross-sectional structure 25. However, without being limited to this, only one vertical wall may be used for partitioning.

Second Embodiment

Next, a second embodiment of the present invention will be described with reference to FIG. 5. The same modes as those in the first embodiment are denoted by the same reference numerals, and their descriptions will be omitted.

Figure 5:
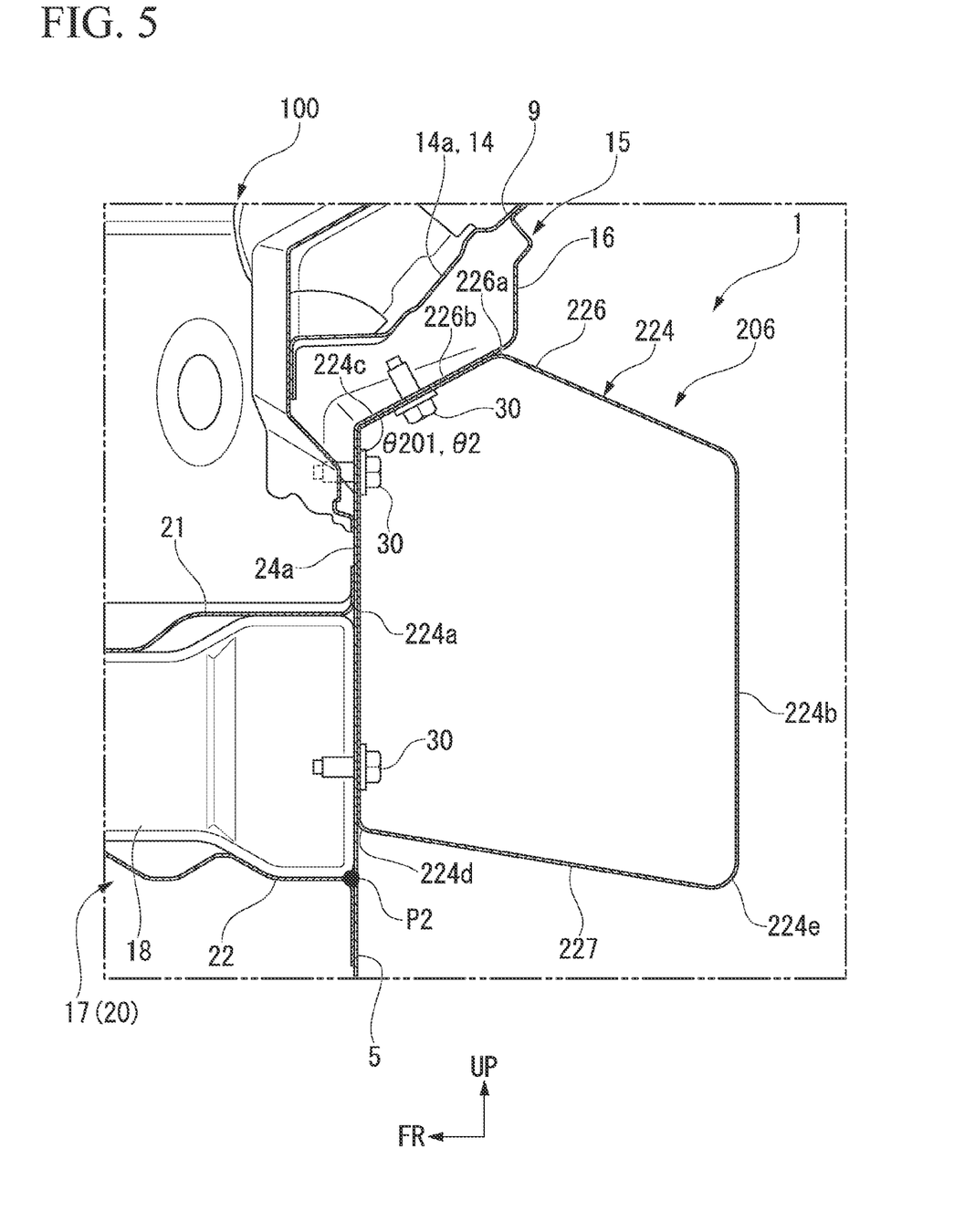
FIG. 5 is a cross-sectional view taken along a front-rear direction and an up-down direction of a bumper beam in a second embodiment of the present invention.

FIG. 5 is a cross-sectional view taken along the front-rear direction and the up-down direction of a bumper beam 206 in the second embodiment. FIG. 5 corresponds to FIG. 3 described above.

As illustrated in FIG. 5, the above-described first embodiment and the second embodiment are different in that the bumper beam 6 in the first embodiment and the bumper beam 206 in the second embodiment are different from each other.

More specifically, the bumper beam 206 includes one closed cross-sectional structure 224 formed to extend along the vehicle width direction, while extending along the rear panel 5. The length of the closed cross-sectional structure 224 in the vehicle width direction is, for example, approximately three times the width of the striker attachment portion 14 in the vehicle width direction. The closed cross-sectional structure 224 has a tubular shape elongated in the vehicle width direction. The closed cross-sectional structure 224 includes a front vertical wall 224a and a rear vertical wall 224b, which are disposed to face each other in the front-rear direction and extend along the left-right direction and the up-down direction.

An upper projection 226 is formed at an upper end portion 224c of the closed cross-sectional structure 224. The upper projection 226 tapers upward, when viewed from the vehicle width direction. A ridge portion 226a of the upper projection 226 is located slightly on a front side with respect to the center in the front-rear direction of the closed cross-sectional structure 224. An angle θ201 between the front vertical wall 224a and one wall 226b of the upper projection 226, which is continuous with the front vertical wall 224a, is identical to an angle θ2 between the rear panel 5 and the panel 16.

The position of a lower end portion 224e of the rear vertical wall 224b is located on a lower side than the position of a lower end portion 224d of the front vertical wall 224a. A bottom wall 227 is formed so as to connect the lower end portions 224d and 224e. The bottom wall 227 extends obliquely gradually downward as approaching the rear side.

In such a constitution, the closed cross-sectional structure 224 is disposed such that the front vertical wall 224a overlaps the rear panel 5 and such one wall 226b of the upper projection 226 overlaps the panel 16 (the peripheral edge frame structure 15).

In a state disposed in this manner, in the second embodiment, the lower end portion 224d of the front vertical wall 224a is located on an upper side than the position of the intersection point P2 between the plane direction of the lower panel 22 and the rear panel 5, in a similar manner to the above-described first embodiment. However, without being limited to this, it is sufficient if the lower end portion 224d of the front vertical wall 224a is located almost the same or higher than the position of the intersection point P2. It is sufficient if the position of the lower end portion 224e of the rear vertical wall 224b is lowered in accordance with the position of the lower end portion 224d of the front vertical wall 224a.

The closed cross-sectional structure 224 is fastened and fixed to the rear panel 5 and the peripheral edge frame structure 15 with the plurality of bolts 30. More specifically, the bolts 30 are inserted into four corners of the front vertical wall 224a from the rear side. These bolts 30 are screwed into the rear panel 5. In addition, the bolts 30 are respectively inserted from the rear side into such one wall 226b of the upper projection 226 on both sides in the vehicle width direction. These bolts 30 are fastened and fixed to the panel 16 of the peripheral edge frame structure 15.

In this manner, in the above-described second embodiment, the position of the lower end portion 224e of the rear vertical wall 224b in the bumper beam 206 is located on a lower side than the position of a lower end portion 224d of the front vertical wall 224a. Therefore, for example, even in a case where the height of the vehicle 100 or the height of the rear floor panel 17 provided on a front side of the bumper beam 206 varies depending on the vehicle type, it is possible to set the position of the bumper beam 206 at a desired height. For example, even in a case of the vehicle 100 that is high in the vehicle height, it is possible to lower the position of the surface (the rear vertical wall 224b), which receives the rear collision load F1, of the bumper beam 206. Accordingly, the rear collision load F1 can be received by the bumper beam 206 with certainty. That is, for example, even in a case where a following vehicle is a vehicle that is low in the vehicle height, it is possible to prevent the following vehicle from getting into under the bumper beam 206 at the time of collision of the vehicle. Then, the bumper beam 206 is enabled to receive the rear collision load F1 with certainty.

Note that the present invention is not limited to the above-described embodiments, and includes various modifications to the above-described embodiments without departing from the scope of the present invention.

For example, the constitution of the bumper beam 6 in the above-described first embodiment and the constitution of the bumper beam 206 in the above-described second embodiment may be combined together. That is, for example, the position of the second closed cross-sectional structure 25 in the first embodiment may be located to be lower than the position of the first closed cross-sectional structure 24.

In the above-described embodiments, the description has been given for the case where the rear floor panel 17 is constituted by the double panel structure 20 including the upper panel 21 and the lower panel 22, which are arranged to face each other in the up-down direction, and which extend in the horizontal direction. However, without being limited to this, the rear floor panel 17 may be constituted by either one of the upper panel 21 or the lower panel 22. In addition, the double panel structure 20 may be formed by aluminum extrusion molding.

In the above-described embodiments, the description has been given for the case where the pair of rear side frames 18 are disposed on the left and right sides of the vehicle 100. However, without being limited to this, and instead of the pair of rear side frames 18, a center frame extending in the front-rear direction may be provided at the center of the vehicle 100 in the vehicle width direction. Such a center frame and the bumper beam 6 or 206 may be disposed at positions overlapping each other, when viewed from the front-rear direction.

In the above-described embodiments, the description has been given for the case where the peripheral edge frame structure 15 having a closed cross-sectional structure is provided in a part of the lower peripheral edge frame 9 of the peripheral edge frames 8 to 10, which form the rear opening 4 of the vehicle 100. However, without being limited to this, and separately from the peripheral edge frames 8 to 10, a closed cross-sectional structure may be provided on an upper portion of the rear panel 5, and the upper portion (the upper projection 26 or 226) of the bumper beam 6 or 206 may be brought into contact with the lower surface of such a structure.

In the above-described embodiments, the description has been given for the case where the upper projection 26 or 226 is formed in the upper end portion 24c of the first closed cross-sectional structure 24 or the upper end portion 224c of the closed cross-sectional structure 224. Then, the description has been given for the case where such one wall 26b or 226b of the upper projection 26 or 226 is brought into contact with the lower surface (the panel 16) of the peripheral edge frame structure 15. However, the shape of each closed cross-sectional structures 24, 25, or 224 is not limited to that described in the above-described embodiments, and any shape is applicable. It is sufficient if the upper portion of each closed cross-sectional structures 24, 25, or 224 is in contact with the lower surface of the closed cross-sectional structure provided on the upper portion of the rear panel 5.

In the above-described embodiments, the description has been given for the case where the bumper beam 6 or 206 is fastened and fixed to the rear panel 5 and the peripheral edge frame structure 15 with the bolts 30. However, without being limited to this, the bumper beam 6 or 206 may be joined to the rear panel 5 and the peripheral edge frame structure 15 by spot welding or the like. Furthermore, the bumper beam 6 or 206 does not have to be fixed to the peripheral edge frame structure 15. It is sufficient if the bumper beam 6 or 206 is in contact with the lower surface (the panel 16) of the peripheral edge frame structure 15.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle rear portion structure comprising:
   a frame extending in a front-rear direction of a vehicle;
   a bumper beam disposed on a rear side of the frame; and
   a rear panel provided between the frame and the bumper beam, wherein
   the rear panel includes an upper structure which is provided at an upper part of the bumper beam and which has a closed cross-sectional structure, and
   an upper portion of the bumper beam is in contact with a lower surface of the upper structure.

2. The vehicle rear portion structure according to claim 1, wherein
   the bumper beam is fastened and fixed with a bolt to be screwed into the rear panel from an inside of the bumper beam via the bumper beam.

3. The vehicle rear portion structure according to claim 1, wherein
   the bumper beam is fastened and fixed with a bolt to be screwed into the upper structure from an inside of the bumper beam via the bumper beam.

4. The vehicle rear portion structure according to claim 2, wherein
   a hole is defined in the bumper beam, and the bolt and a tool for fastening the bolt are insertable into the hole in a front-rear direction of the vehicle.

5. The vehicle rear portion structure according to claim 1, wherein
   a position of a rear end and a lower end of the bumper beam is located lower than a position of a front end and a lower end of the bumper beam.

6. The vehicle rear portion structure according to claim 1, wherein
   a position of a front end and a lower end of the bumper beam is located higher than a position of a spare tire disposed on a front side of the bumper beam.

7. The vehicle rear portion structure according to claim 1, further comprising
   a peripheral edge frame that forms a rear opening communicating a baggage compartment provided at a rear portion of the vehicle and an outside of the vehicle, wherein
   an upper portion of the rear panel is coupled with the peripheral edge frame.

8. The vehicle rear portion structure according to claim 1, wherein
   the bumper beam includes at least one closed cross-sectional structure including projections on up and down sides when viewed from a vehicle width direction of the vehicle.

9. The vehicle rear portion structure according to claim 8, wherein
   the bumper beam includes a plurality of the closed cross-sectional structures, and
   the plurality of the closed cross-sectional structures are disposed to be aligned in a front-rear direction of the vehicle.

10. The vehicle rear portion structure according to claim 8, further comprising
    a reinforcement plate provided inside the closed cross-sectional structure and extending in a direction intersecting a front-rear direction and an up-down direction, when viewed from the vehicle width direction of the vehicle.

* * * * *